(12) United States Patent
Weng (10) Patent No.: US 9,013,064 B2
(45) Date of Patent: Apr. 21, 2015

(54) ELECTRONIC DEVICE WITH LOW STANDBY POWER CONSUMPTION

(75) Inventor: Bo Min Weng, Tainan (TW)

(73) Assignee: Hannstar Display Corp., New Taipei (TW)

( * ) Notice: Subject to any disclaimer, the term of this patent is extended or adjusted under 35 U.S.C. 154(b) by 661 days.

(21) Appl. No.: 13/329,600

(22) Filed: Dec. 19, 2011

(65) Prior Publication Data
US 2012/0261995 A1 Oct. 18, 2012

(30) Foreign Application Priority Data
Apr. 13, 2011 (TW) .............................. 100112761 A (51) Int. Cl.
*H02J 7/00* (2006.01)
*H02J 9/00* (2006.01)

(52) U.S. Cl.
CPC ...................................... *H02J 9/005* (2013.01)

(58) Field of Classification Search
CPC ........ Y02E 60/12; H02J 9/005; H02J 7/0016; H02J 7/0031; H02J 7/0021; H02J 7/345; H02J 2007/005; H02J 9/04; Y02B 70/16
USPC ...................................................... 307/64, 66
See application file for complete search history.

(56) References Cited

U.S. PATENT DOCUMENTS

| | | |
|---|---|---|
| 2001/0010639 A1 | 8/2001 | Shirato et al. |
| 2002/0036910 A1 | 3/2002 | Yang |
| 2010/0001695 A1 | 1/2010 | Arai et al. |
| 2011/0116289 A1* | 5/2011 | Zong et al. ...................... 363/49 |
| 2012/0236609 A1* | 9/2012 | Choi et al. ...................... 363/49 |

* cited by examiner

*Primary Examiner* — Carlos Amaya
(74) *Attorney, Agent, or Firm* — Lowe Hauptman & Ham, LLP (57) ABSTRACT

There is provided an electronic device including a power circuit and a system circuit. The system circuit includes a processing unit and a charge-discharge device. The processing unit controls the power circuit to stop providing power to the system circuit when identifying that the electronic device enters a standby state and that a discharge voltage of the charge-discharge device is higher than a predetermined voltage thereby decreasing a standby power consumption of the electronic device.

14 Claims, 5 Drawing Sheets

ELECTRONIC DEVICE WITH LOW STANDBY POWER CONSUMPTION

CROSS REFERENCE TO RELATED APPLICATION

This application claims the priority benefit of Taiwan Patent Application Serial Number 100112761, filed on Apr. 13, 2011, the full disclosure of which is incorporated herein by reference.

BACKGROUND

1. Field of the Invention

This disclosure generally relates to an electronic device and, more particularly, to an electronic device having low standby power consumption.

2. Description of the Related Art

With the problems of global energy shortage and global warming becoming critical, all countries are actively developing new alternative energy sources and decreasing the total power consumption thereby reducing the creation of the amount of carbon dioxide, wherein the standby power consumption of various electronic devices is also involved in related standards.

Figure 1A:
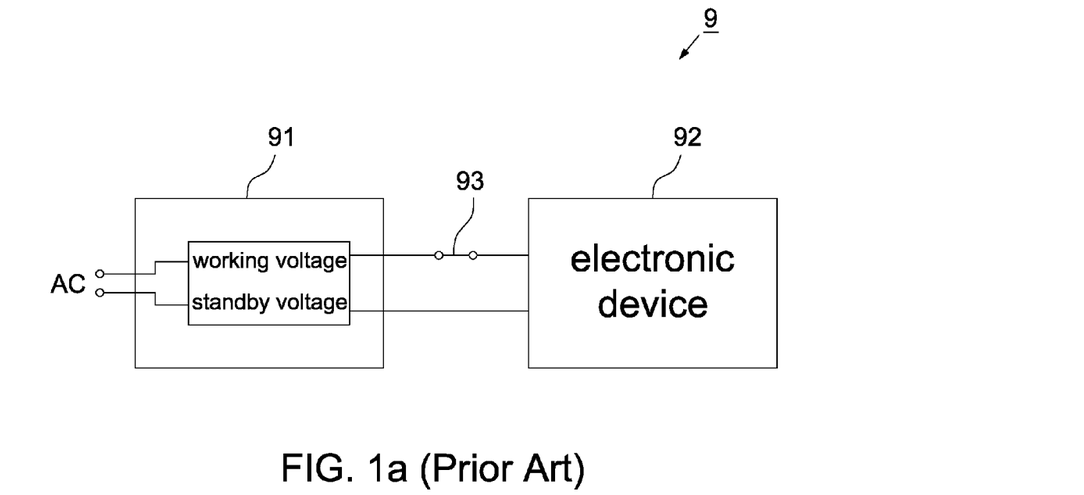
FIG. 1a shows a schematic block diagram of a conventional electronic product in normal operation.
Figure 1B:
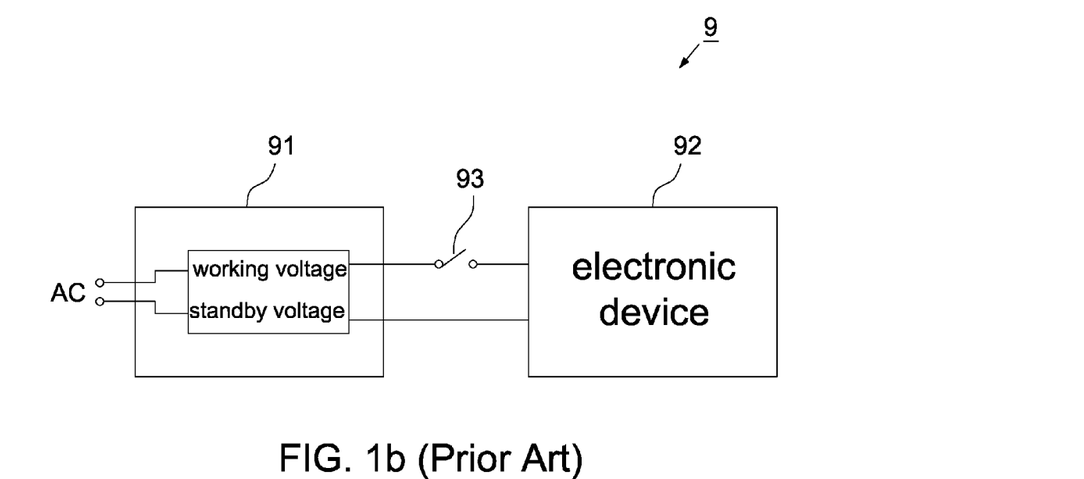
FIG. 1b shows a schematic block diagram of a conventional electronic product in standby state.

Generally speaking, the power circuit of an electronic product includes a main circuit and a standby circuit. For example, FIGS. 1a and 1b show an electronic product 9 which includes a power circuit 91 and an electronic device 92. In normal operation (as shown in FIG. 1a), a main circuit of the power circuit 91 provides a working voltage to the electronic device 92 through a switching element 93 such that the electronic device 92 can execute an operation desired by a user normally.

If no input signal is detected, the electronic product 9 will enter a standby state. At this moment, the electronic product 9 controls the switching element 93 to switch off to allow a standby circuit of the power circuit 91 to provide a standby voltage to the electronic device 92 (as shown in FIG. 1b). Although most electronic products manufactured in these years can fulfill the standards of standby power consumption of every country, the global standby power consumption is gradually increasing as the total number of electronic products globally is enormous.

Accordingly, it is necessary to provide an electronic device that consumes almost no power in standby state.

SUMMARY

The present disclosure provides an electronic device that has zero standby power consumption in standby state.

The present disclosure provides an electronic device including a power circuit and a system circuit. The power circuit is configured to provide a standby voltage and includes a control switch for controlling output of the standby voltage. The system circuit includes a charge-discharge device, a voltage regulator and a processing unit. The charge-discharge device is coupled to the standby voltage and outputs a discharge voltage. The voltage regulator is coupled to the standby voltage or the discharge voltage and outputs an operation voltage. The processing unit is coupled to the operation voltage and includes a detection unit, wherein the detection unit is configured to detect the discharge voltage outputted by the charge-discharge device to accordingly control on/off of the control switch.

The present disclosure further provides an electronic device including a power circuit, a charge-discharge device, a voltage regulator and a processing unit. The power circuit is configured to provide a standby voltage and includes a control switch for controlling output of the standby voltage. The charge-discharge device is coupled to the standby voltage and outputs a discharge voltage. The voltage regulator is coupled to the standby voltage or the discharge voltage and outputs an operation voltage. The processing unit is coupled to the operation voltage and includes a detection unit for detecting the discharge voltage outputted by the charge-discharge device to accordingly control on/off of the control switch.

In an aspect, when detecting that the discharge voltage is larger than a predetermined voltage, the detection unit controls the control switch to switch off; and when detecting that the discharge voltage is smaller than the predetermined voltage, the detection unit controls the control switch to switch on.

In an aspect, the processing unit further includes a counting unit. At least one of the detection unit and the counting unit is powered by the charge-discharge device or the processing unit.

The electronic device of the present disclosure includes a power circuit and a system circuit. The system circuit includes a processing unit and a charge-discharge device. The processing unit controls the power circuit to stop providing power to the system circuit when identifying that the electronic device enters a standby state and that a discharge voltage of the charge-discharge device is higher than a predetermined voltage thereby decreasing a standby power consumption of the electronic device.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

In the drawings of the present disclosure, only a part of the components are shown and other components that are not directly related to the present disclosure are omitted.

Figure 2:
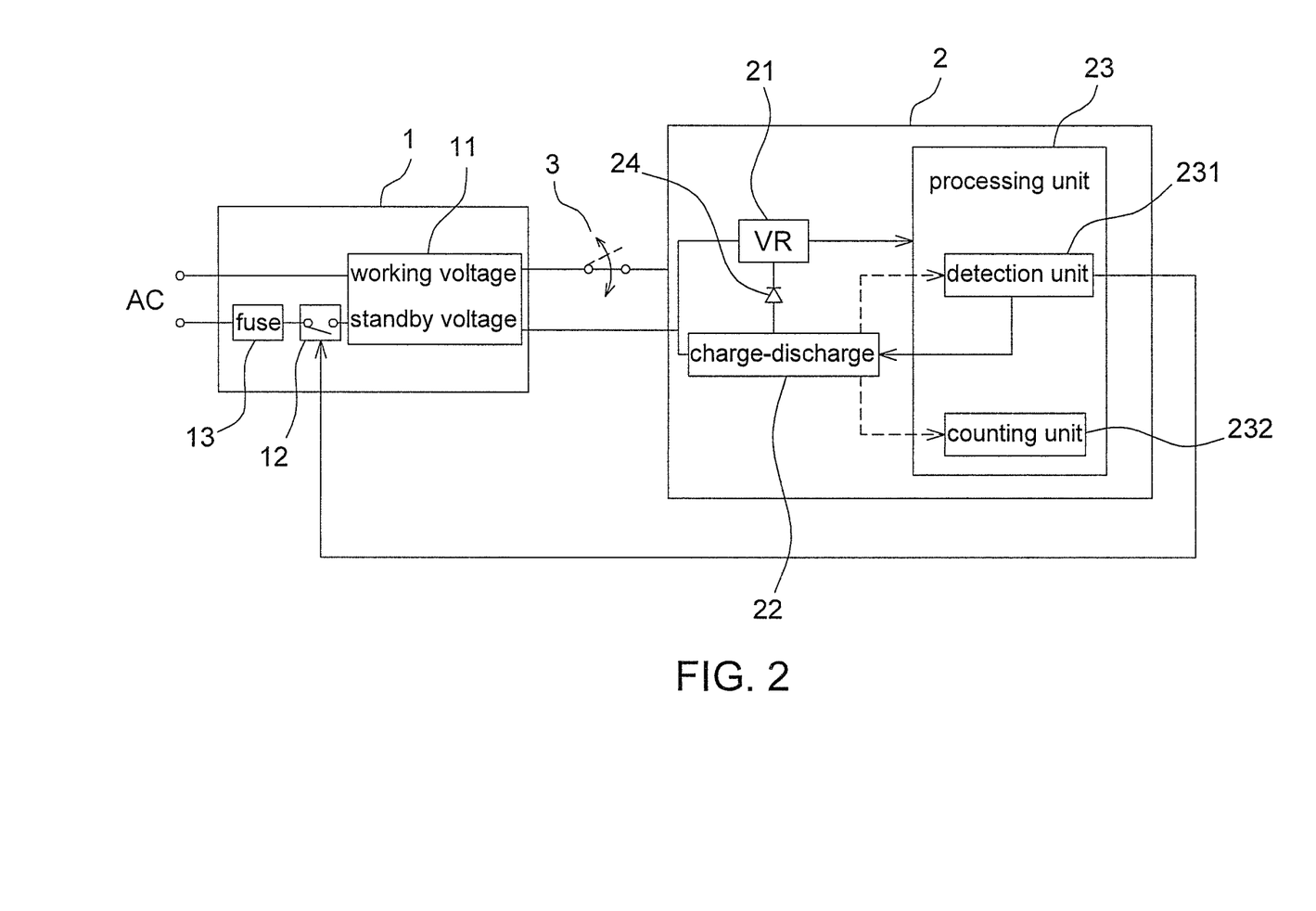
FIG. 2 shows a schematic block diagram of the electronic device according to the first embodiment of the present disclosure.

Please refer to FIG. 2, it shows a schematic block diagram of the electronic device according to the first embodiment of the present disclosure. Embodiments of the electronic device according to the present disclosure may be a network TV, a smart TV or a traditional TV, but not limited thereto. The electronic device may include a power circuit 1 and a system circuit 2. The power circuit 1 and the system circuit 2 may be physically separated from but electrically coupled with each other, or may be manufactured in the same device or integrated on the same circuit board.

The power circuit 1 is coupled to between an AC power source and the system circuit 2, configured to convert AC power to DC power, and provides the DC power to the system circuit 2. When the electronic device is in normal operation, the power circuit 1 may provide a working voltage to the system circuit 2 through a switching element 3, wherein the working voltage may be 5 volts, 12 volts, 24 volts or other DC voltages used by general commercial electronic devices. When the electronic device enters a standby state, the switching element 3 is switched off and the power circuit 1 first provides a standby voltage to the system circuit 2. Then, the system circuit 2 determines whether to control the power circuit 1 to stop providing the standby voltage so as to reduce the standby power consumption to zero (described later), wherein the standby voltage maybe 5 volts, but not limited thereto. It is appreciated that when the electronic device enters the standby state, the system circuit 2 has to inform the power circuit 1 to provide the standby voltage and to control the switching element 3 to switch off at the same time. In addition, it should be mentioned that a method for identifying whether an electronic device is in standby state or in normal operation is well known, and thus details thereof will not be repeated herein. Descriptions below will be focused on the method of saving the standby power consumption when the electronic device enters the standby state, and details of the electronic device in normal operation will not be included.

The power circuit 1 includes a power supply unit 11, a control switch 12 and a fuse 13. The power supply unit 11 is configured to convert AC power to DC power and to provide a working voltage or a standby voltage, wherein which of the working voltage or the standby voltage is provided by the power supply unit 11 may be determined according to an operation state of the system circuit 2. In the present disclosure, when the electronic device enters the standby state, the control switch 12 is switched on or switched off (described later) under the control of the system circuit 2, and the power supply unit 11 may or may not provide the standby voltage to the system circuit 2. When the power supply unit 11 does not provide the standby voltage to the system circuit 2 in standby state, a standby power consumption of the electronic device is significantly decreased. The fuse 13 performs over-current protection on the electronic device.

The system circuit 2 includes a voltage regulator (VR) 21, a charge-discharge device 22 and a processing unit 23. The voltage regulator 21 is coupled to the working voltage or the standby voltage from the power circuit 1, or coupled to a discharge voltage of the charge-discharge device 22, and regulates the voltage coupled thereto to an operation voltage required by the processing unit 23. The charge-discharge device 22 may be a rechargeable battery, which is charged by the standby voltage outputted by the power circuit 1 and serves as a standby power source of the processing unit 23 and elements therein in standby state. The processing unit 23 may be, for example, a system control circuit or a control chip, which includes a detection unit 231 and a counting unit 232. The detection unit 231 is configured to detect whether the discharge voltage of the charge-discharge device 22 is higher than a predetermined voltage thereby controlling on/off of the control switch 12 of the power circuit 1. The counting unit 232 performs counting function in standby state, e.g. for reserve-recording, but not limited thereto. In standby state, the detection unit 231 and the counting unit 232 may be powered by the processing unit 23 or directly powered by the charge-discharge device 22. Next, the operation of every element when the electronic device enters the standby state will be described hereinafter. In other embodiments, in standby state at least one element in the processing unit 23, e.g. the detection unit 231 and/or the counting unit 232, may be directly powered by the charge-discharge device 22.

When the processing unit 23 identifies that the electronic device enters the standby state, the processing unit 23 controls the switching element 3 to switch off and controls the control switch 12 to switch on such that the power supply unit 11 may provide the standby voltage to the system circuit 2.

The voltage regulator 21 regulates the standby voltage to the operation voltage required by the processing unit 23 and then inputs the operation voltage to the processing unit 23, and the standby voltage charges the charge-discharge device 22 simultaneously.

Next, the detection unit 231 detects the discharge voltage of the charge-discharge device 22 and identifies whether the discharge voltage is larger than the predetermined voltage. When the discharge voltage of the charge-discharge device 22 is larger than the predetermined voltage, it means that the charge-discharge device 22 stores enough power for supporting the standby operation of the processing unit 23 and the detection unit 231 informs the control switch 12 of the power circuit 1 to switch off such that the standby power consumption of the electronic device is reduced to zero.

When the control switch 12 is switched off, the system circuit 2 does not receive the standby voltage provided from the power circuit 1. At the moment, the charge-discharge device 22 provides power to the voltage regulator 21, and the voltage regulator 21 regulates the discharge voltage outputted by the charge-discharge device 22 to the operation voltage required by the processing unit 23 and then inputs the operation voltage to the processing unit 23. Meanwhile, the charge-discharge device 22 may directly provide power to the detection unit 231 and/or the counting unit 232 (as shown by the dashed line). It should be mentioned that, although the control switch 12 of the power circuit 1 is shown to be disposed at an input terminal of the power supply unit 11 in this embodiment, the control switch 12 may also be disposed at any appropriate place, for example, an output terminal of or integrated in the power supply unit 11 in other embodiments.

On the other hand, when the discharge voltage of the charge-discharge device 22 is smaller than the predetermined voltage, it means that the charge-discharge device 22 does not store enough power for supporting the standby operation of the processing unit 23, and the detection unit 231 controls the control switch 12 of the power circuit 1 to switch on continuously such that the power supply unit 11 may provide the standby voltage to the voltage regulator 21 and charge the charge-discharge device 22. Meanwhile, the detection device 231 continuously detects the discharge voltage of the charge-discharge device 22. When detecting that the discharge voltage of the charge-discharge device 22 is larger than the predetermined voltage, the detection unit 231 informs the control switch 12 to switch off thereby eliminating the standby power consumption. In this embodiment, the system circuit 2 may further include an AND gate 24 coupled to between the voltage regulator 21 and the charge-discharge device 22. When a voltage difference on the AND gate 24 is larger than its breakover voltage, the charge-discharge device 22 is able to provide power to the voltage regulator 21. On the contrary, when the voltage difference on the AND gate 24 is smaller than its breakover voltage, the charge-discharge device 22 is not able to provide power to the voltage regulator 21. In addition, the power consumption of the detection unit 231 and the counting unit 232 in standby state may be provided by the processing unit 23 or directly provided by the charge-discharge device 22.

In the present disclosure, as the system circuit 2 includes the charge-discharge device 22, all standby power of the processing unit 23 in standby state may be provided by the charge-discharge device 22. In addition, as the system circuit 2 includes the detection unit 231 to detect the power stored in the charge-discharge device 22, it is able to prevent the power stored in the charge-discharge device 22 from being entirely consumed to cause the processing unit 23 unable to support the standby operation when the standby state lasts for a long time.

Figure 3:
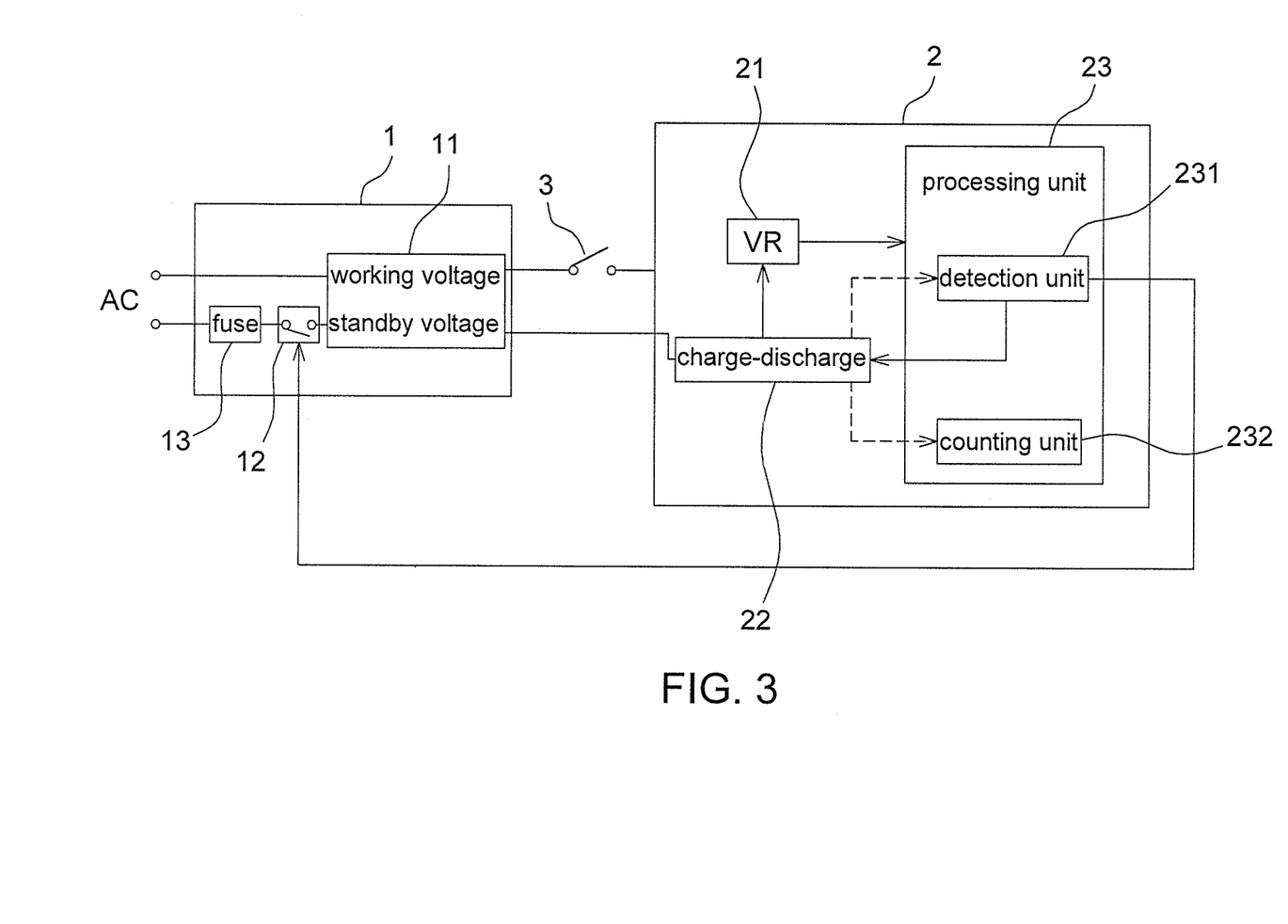
FIG. 3 shows a schematic block diagram of the electronic device according to the second embodiment of the present disclosure.

Please refer to FIG. 3, it shows a schematic block diagram of the electronic device in standby state according to the second embodiment of the present disclosure. The difference between the electronic device of the second embodiment and that of the first embodiment is that the power circuit 1 is only coupled to the charge-discharge device 22 without being coupled to the voltage regulator 21. In other words, consuming power of the processing unit 23 is totally provided through the charge-discharge device 22. The voltage regulator 21 regulates a discharge voltage provided by the charge-discharge device 22 to an operation voltage required by the processing unit 23 and then inputs the operation voltage to the processing unit 23.

When identifying that the electronic device enters a standby state, the processing unit 23 controls the switching element 3 to switch off and controls the control switch 12 to switch on to allow the power supply unit 11 to provide a standby voltage to the system circuit 2.

The standby voltage charges the charge-discharge device 22, and the voltage regulator 21 regulates the discharge voltage outputted by the charge-discharge device 22 to the operation voltage required by the processing unit 23 and then inputs the operation voltage to the processing unit 23.

Next, the detection unit 231 detects the discharge voltage of the charge-discharge device 22 and identifies whether the discharge voltage is larger than a predetermined voltage. When the discharge voltage of the charge-discharge device 22 is larger than the predetermined voltage, the detection unit 231 informs the control switch 12 of the power circuit 1 to switch off such that the standby power consumption of the electronic device is reduced to zero. It should be mentioned that although the control switch 12 of the power circuit 1 is shown to be disposed at an input terminal of the power supply unit 11 in this embodiment, the control switch 12 may be disposed at an output terminal of or integrated in the power supply unit 11 in other embodiments.

When the control switch 12 is switched off, the charge-discharge device 22 provides power to the voltage regulator 21, and the voltage regulator 21 regulates the discharge voltage provided by the charge-discharge device 22 to the operation voltage required by the processing unit 23 and then inputs the operation voltage to the processing unit 23. Meanwhile, the charge-discharge device 22 may also directly provide power to the detection unit 231 and/or the counting unit 232 (as shown by the dashed line).

On the other hand, when the discharge voltage of the charge-discharge device 22 is smaller than the predetermined voltage, the detection unit 231 controls the control switch 12 of the power circuit 1 to switch on continuously to allow the power supply unit 11 to charge the charge-discharge device 22 and to provide the standby power required by the processing unit 23. Meanwhile, the detection unit 231 continuously detects the discharge voltage of the charge-discharge device 22 and informs the control switch 12 to switch off when detecting that the discharge voltage of the charge-discharge device 22 is larger than the predetermined voltage. When the control switch 12 is switched off, the AC power source will not be provided to the power supply unit 11 and the power circuit 1 does not consume any power from the AC power source at this moment. In this manner, it is able to effectively eliminate the total standby power consumption of the electronic device. In addition, the power consumption of the detection unit 231 and the counting unit 232 in standby state may be provided by the processing unit 23 (now the power consumption of the processing unit 23 is provided by the voltage regulator 21), or directly provided by the charge-discharge device 22 without passing through other elements of the processing unit 23.

Figure 4:
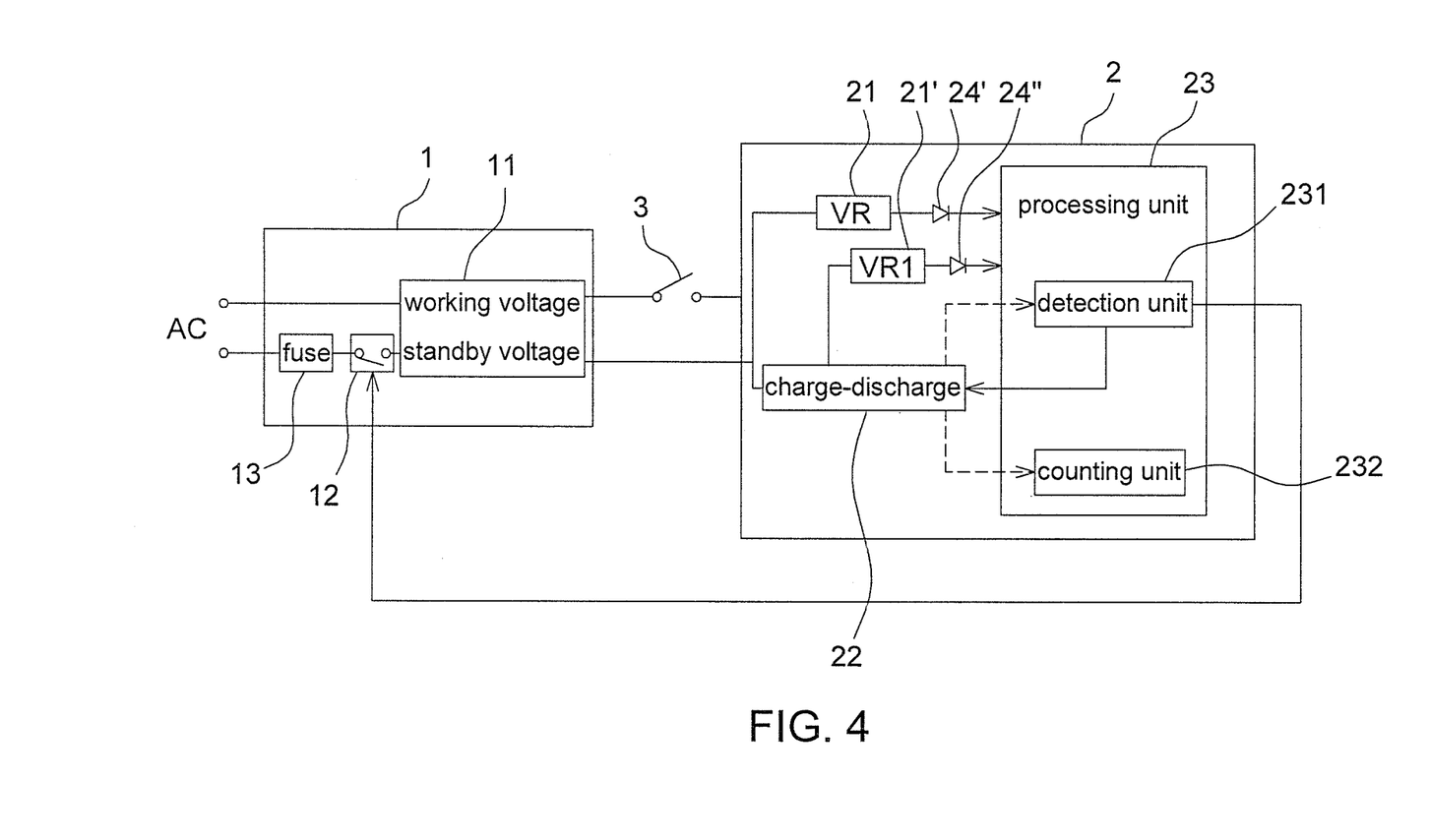
FIG. 4 shows a schematic block diagram of the electronic device according to the third embodiment of the present disclosure.

Please refer to FIG. 4, it shows a schematic block diagram of the electronic device in standby state according to the third embodiment of the present disclosure. The difference between the electronic device of the third embodiment and that of the first embodiment is that the system circuit 2 includes a voltage regulator (VR) 21 and a first voltage regulator (VR1) 21'. In addition, the system circuit 2 further includes a first AND gate 24' and a second AND gate 24", wherein when voltage differences on the first AND gate 24' and the second AND gate 24" are larger than their breakover voltages, the first AND gate 24' and the second AND gate 24" are turned on. The first AND gate 24' is coupled to between the voltage regulator 21 and the processing unit 23, and the second AND gate 24" is coupled to between the first voltage regulator 21' and the processing unit 23. When the electronic device is in standby state and the charge-discharge device 22 stores enough power (i.e. the discharge voltage is larger than the predetermined voltage) for providing power to the processing unit 23, the standby voltage is not outputted by the power supply unit 11 (i.e. the control switch 12 is switched off), and thus the first AND gate 24' is off but the second AND gate 24" is on. When the electronic device is in standby state but the charge-discharge device 22 does not store enough power (i.e. the discharge voltage is smaller than the predetermined voltage) for providing power to the processing unit 23, the control switch 12 is continuously switched on. At the moment, the power supply unit 11 outputs the standby voltage, and thus the first AND gate 24' is on but the second AND gate 24" is off.

When identifying that the electronic device enters the standby state, the processing unit 23 controls the switching element 3 to switch off and controls the control switch 12 to switch on to allow the power supply unit 11 to provide a standby voltage to the system circuit 2.

The voltage regulator 21 regulates the standby voltage to an operation voltage required by the processing unit 23 and then inputs the operation voltage to the processing unit 23. The standby voltage charges the charge-discharge device 22 simultaneously.

Next, the detection unit 231 detects a discharge voltage of the charge-discharge device 22 and identifies whether the discharge voltage is larger than a predetermined voltage. When the discharge voltage of the charge-discharge voltage 22 is larger than the predetermined voltage, the detection unit 231 informs the control switch 12 of the power circuit 1 to switch off such that the standby power consumption of the electronic device is reduced to zero.

When the control switch 12 is switched off, the first AND gate 24' is off but the second AND gate 24" is on. The charge-discharge device 22 provides power to the first voltage regulator 21', and the first voltage regulator 21' regulates the discharge voltage provided by the charge-discharge device 22 to the operation voltage required by the processing unit 23 and then inputs the operation voltage to the processing unit 23. Meanwhile, the charge-discharge device 22 may directly provide power to the detection unit 231 and/or the counting unit 232.

On the other hand, when the discharge voltage of the charge-discharge device 22 is smaller than the predetermined voltage, the detection unit 231 controls the control switch 12 of the power circuit 1 to continuously switch on to allow the power supply unit 11 to provide the standby voltage to the voltage regulator 21 and charge the charge-discharge device 22. At the moment the first AND gate 24' is on but the second AND gate 24" is off. Meanwhile, the detection unit 231 continuously detects the discharge voltage of the charge-discharge device 22 and informs the control switch 12 to switch off when identifying that the discharge voltage of the charge-discharge device 22 is larger than the predetermined voltage so as to eliminate the standby power consumption. In addition, the power consumption of the detection unit 231 and the counting unit 232 in standby state may be provided by the processing unit 23 or directly provided by the charge-discharge device 22.

Figure 5:
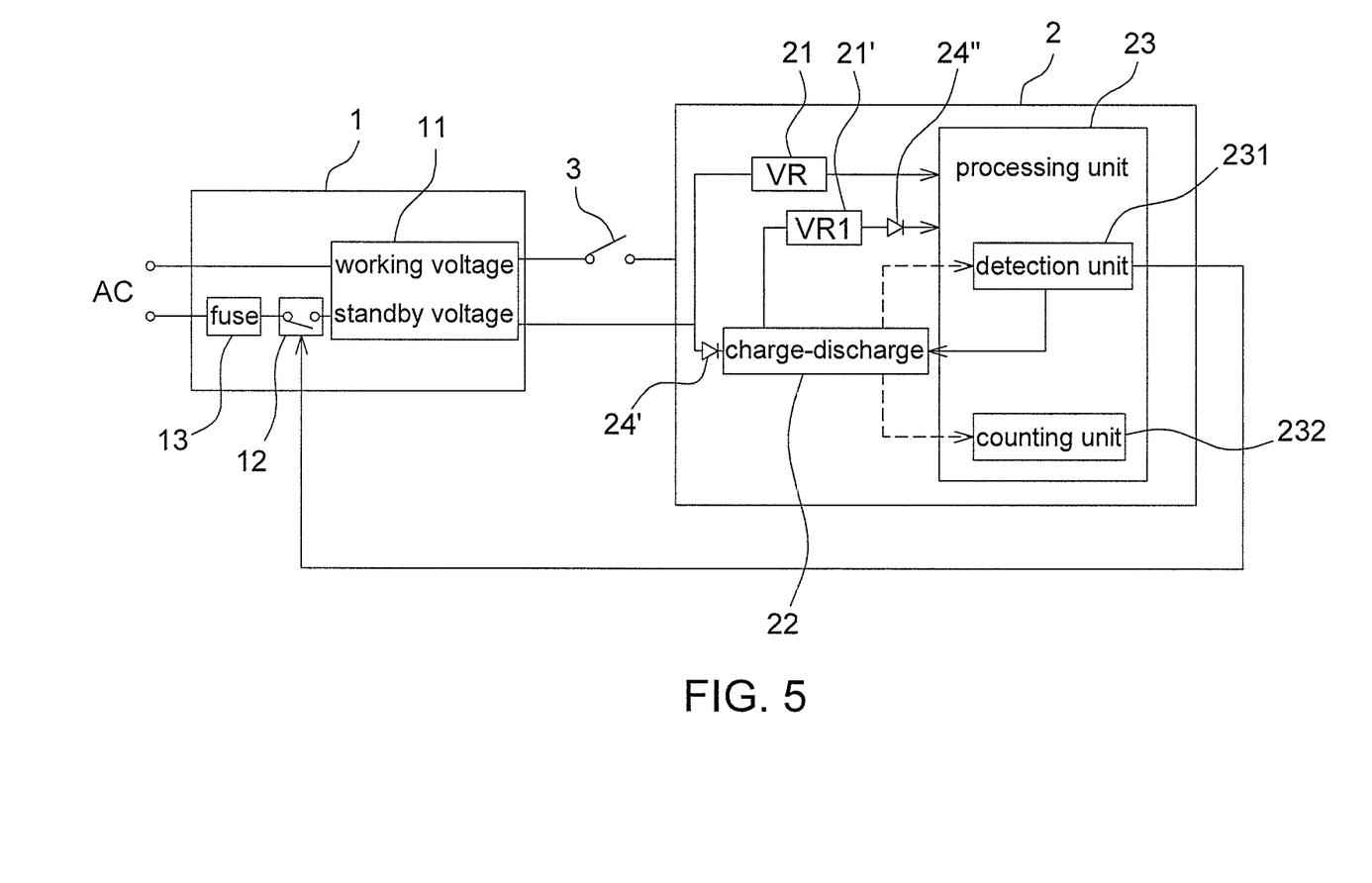
FIG. 5 shows a schematic block diagram of the electronic device according to the fourth embodiment of the present disclosure.

Please refer to FIG. 5, it shows a schematic block diagram of the electronic device in standby state according to the fourth embodiment of the present disclosure. The difference between the fourth embodiment and third embodiment is that the first AND gate 24' is coupled at an input terminal of the charge-discharge device 22. When a discharge voltage of the charge-discharge device 22 is larger than a predetermined voltage, a standby voltage will not be outputted by the power supply unit 11, i.e. the system circuit 2 will not receive power from the power circuit 1. At the moment the second AND gate 24" is on but the first AND gate 24' is off. The charge-discharge device 22 may provide power to the processing unit 23 through the first voltage regulator 21' and the second AND gate 24". When the discharge voltage of the charge-discharge device 22 is smaller than the predetermined voltage, the control switch 12 is switched on and the power supply unit 11 outputs the standby voltage to the system circuit 2. At the moment the first AND gate 24' is on but the second AND gate 24" is off. The standby voltage charges the charge-discharge device 22 through the first AND gate 24' and provides power to the processing unit 23 through the voltage regulator 21. In addition, connections and operations of other components in the fourth embodiment are similar to those in the third embodiment, and thus details thereof will not be repeated herein. In another embodiment, the second AND gate 24" may not be implemented.

As mentioned above, conventional electronic devices will more or less consume power in standby state. The present disclosure further provides an electronic device (FIGS. 2 to 5) that may be applied to video equipments such as a television, but not be limited thereto. The electronic device of the present disclosure includes a charge-discharge device to provide power required by the electronic device in standby state such that the standby power consumption from commercial power source is almost zero. Furthermore, a detection mechanism is incorporated to prevent the storage power of the charge-discharge device is totally consumed such that the electronic device can still perform normal standby operation even the standby state lasts for a long time.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An electronic device, comprising:
a power circuit, configured to provide a standby voltage and comprising a control switch configured to control output of the standby voltage; and
a system circuit, comprising:
a charge-discharge device, coupled to the standby voltage and configured to output a discharge voltage;
a voltage regulator, coupled to the standby voltage or the discharge voltage and configured to output an operation voltage;
an AND gate coupled between the charge-discharge device and the voltage regulator, and
a processing unit, coupled to the operation voltage and comprising a detection unit, wherein the detection unit is configured to detect the discharge voltage outputted by the charge-discharge device to accordingly control on/off of the control switch,
wherein, when the discharge voltage is smaller than a predetermined voltage, the charge-discharge device stops providing the discharge voltage to the voltage regulator via the AND gate and the standby voltage is simultaneously provided to the voltage regulator and the charge-discharge device.

2. The electronic device as claimed in claim 1, wherein
the detection unit is configured to control the control switch to switch off when detecting that the discharge voltage is larger than the predetermined voltage; and
the detection unit is configured to control the control switch to switch on when detecting that the discharge voltage is smaller than the predetermined voltage.

3. The electronic device as claimed in claim 1, wherein, when the discharge voltage is larger than the predetermined voltage, the charge-discharge device provides the discharge voltage to the voltage regulator via the AND gate.

4. The electronic device as claimed in claim 1, wherein the processing unit further comprises a counting unit, and at least one of the detection unit and the counting unit is powered by the charge-discharge device or the processing unit.

5. The electronic device as claimed in claim 1, wherein the voltage regulator is coupled to the discharge voltage without being coupled to the standby voltage.

6. An electronic device, comprising:
a power circuit, configured to provide a standby voltage and comprising a control switch configured to control output of the standby voltage;
a charge-discharge device, coupled to the standby voltage and configured to output a discharge voltage;
a voltage regulator, coupled to the standby voltage or the discharge voltage and configured to output an operation voltage;
an AND gate coupled between the charge-discharge device and the voltage regulator, and
a processing unit, coupled to the operation voltage and comprising a detection unit configured to detect the discharge voltage outputted by the charge-discharge device to accordingly control on/off of the control switch,
wherein, when the discharge voltage is smaller than a predetermined voltage, the charge-discharge device stops providing the discharge voltage to the voltage regulator via the AND gate and the standby voltage is simultaneously provided to the voltage regulator and the charge-discharge device.

7. The electronic device as claimed in claim 6, wherein the processing unit further comprises a counting unit, and at least one of the detection unit and the counting unit is powered by the charge-discharge device or the processing unit.

8. The electronic device as claimed in claim 6, wherein
the detection unit is configured to control the control switch to switch off when detecting that the discharge voltage is larger than the predetermined voltage; and
the detection unit is configured to control the control switch to switch on when detecting that the discharge voltage is smaller than the predetermined voltage.

9. The electronic device as claimed in claim 6, wherein, when the discharge voltage is larger than the predetermined voltage, the charge-discharge device provides the discharge voltage to the voltage regulator via the AND gate.

10. The electronic device as claimed in claim 6, wherein the voltage regulator is coupled to the discharge voltage without being coupled to the standby voltage.

11. An electronic device, comprising:
a power circuit configured to provide a standby voltage and comprising a control switch configured to control output of the standby voltage;
a charge-discharge device coupled to the standby voltage and configured to output a discharge voltage;
a voltage regulator coupled to the discharge voltage and configured to output an operation voltage;
a further voltage regulator coupled to the standby voltage and configured to output the operation voltage;
a processing unit coupled to the operation voltage and comprising a detection unit, wherein the detection unit is configured to detect the discharge voltage outputted by the charge-discharge device to accordingly control on/off of the control switch; and
an AND gate coupled between the voltage regulator and the processing unit;
wherein when the discharge voltage is smaller than a predetermined voltage, the voltage regulator stops converting the discharge voltage to the operation voltage due to the AND gate and the further voltage regulator converts the standby voltage to the operation voltage.

12. The electronic device as claimed in claim 11, further comprising a further AND gate coupled between the further voltage regulator and the processing unit or coupled to an input terminal of the charge-discharge device.

13. The electronic device as claimed in claim 12, wherein when the discharge voltage is larger than the predetermined voltage, the detection unit controls the control switch to switch off, and the further AND gate is off and the AND gate is on.

14. The electronic device as claimed in claim 12, wherein when the discharge voltage is smaller than the predetermined voltage, the detection unit controls the control switch to switch on, and the further AND gate is on and the AND gate is off.

* * * * *